United States Patent Office 3,297,662
Patented Jan. 10, 1967

3,297,662
METHOD OF PREPARING HARD RUBBER CRUMB
Walter O. Farrell, 9830 Deerfield Circle, Indianapolis, Ind. 46360, and Louis S. Verde, 1149 California Road, Eastchester, Tuckahoe, N.Y. 10709
No Drawing. Filed Aug. 16, 1965, Ser. No. 480,197
2 Claims. (Cl. 260—79.5)

This specification is a continuation-in-part of our co-pending application, Ser. No. 139,368, filed Sept. 20, 1961, now abandoned.

This invention relates to a novel method of preparing hard rubber.

Hard rubber in the form of dust or as finely pulverized hard rubber, has many uses, the most important of which is acting as a filler in hard rubber molding stocks. These molding stocks are employed in the manufacture of battery cases, bowling balls, soft drink cases, etc., and the quality of these manufactured articles depends in large part upon the quality of the hard rubber dust used as a filler in the molding stock from which they are made. (The term "hard rubber" as used within this specification means any sulfur-curable elastomer in a state of complete cure; i.e., substantially all unsaturations in the elastomer chain have reacted with sulfur.)

In the past, hard rubber dust has been prepared by first vulcanizing rubber with about 40% of its weight of sulfur in the presence of one or more rubber compounding materials and then pulverizing the hard rubber thus formed. In a typical hard rubber preparation, 43 parts of sulfur and 8 parts of linseed oil are milled into 100 parts of natural rubber. The batch is mixed on a rubber mill, and then cut into slabs of desired dimensions.

The slabs are then placed on metal trays, and the loaded trays are submerged under water in a pressure vulcanizer where the rubber is cured by subjecting it to elevated steam pressures (and therefore elevated temperatures) for many hours. After the curing process is completed, the slabs which now consist of hard rubber, are pulverized to the desired state of subdivision to provide a hard rubber dust.

The above process has several draw backs. In the first place, the curing reaction, during which sulfur atoms cross-link the polyisoprene chains via reaction with residual double bonds in the chains, is highly exothermic. One reason for curing the hard rubber slabs under water is to dissipate the heat of the reaction and thus prevent overheating by taking advantage of the high heat capacity of water by using the water itself as a moderator. However, even the underwater process does not entirely solve the problem of dissipating the heat of the reaction cure since most of the vulcanization reaction does not take place at the rubber-water interface, but rather in the interior of the rubber slab. Rubber either in the uncured form or in the form of hard rubber, is a poor conductor of heat and local overheating still takes place despite the presence of water in the vulcanizer. Overheating of the rubber slab during the cure reaction causes a side-reaction wherein sulfur displaces a hydrogen in the polyisoprene, with a consequent deterioration in the quality of the hard rubber.

It is an object of this invention to provide a process for the manufacture of hard rubber dust which avoids the drawbacks of the prior art processes, which is economical, which is capable of handling large quantities of raw material, and which produces a hard rubber dust of uniformly high quality.

In fulfillment of the above and other objects, this invention provides a method for making hard rubber which comprises heating an aqueous dispersion or slurry containing sulfur, elastomer crumb either in the uncured state or as soft "rubber" until substantially all the elastomer present is converted into hard rubber. After the elastomer present has reacted with sulfur to form a hard rubber; i.e., after the "cure" is substantially complete, the slurry, which now contains particles of hard rubber, is dried. The dried, hard rubber particles can be used as such or can be ground into hard rubber dust for use in hard rubber formulations.

The elastomer crum for use in the above process can be prepared by pulverizing or chopping sheets of elastomer into elastomer crumb particles having a cross-section greater than 0.003 inch but not greater than 3/16 inch and preferably not greater than 3/32 inch. The elastomers which can be used to furnish the elastomer crumb include all those which have been used in the past to prepare hard rubber or which can be used; in other words, any sulfur-vulcanizable elastomer. Among such sulfur-vulcanizable polymers are elastomers formed from a single monomer including natural rubber, polyisoprene, and polybutadiene, and copolymers including styrene-butadiene copolymers containing from 10–99% butadiene and from 1–90% of styrene and butadiene copolymers with acrylonitrile or vinylpyridine or the like. The elastomer can be in the uncured state; i.e., contains no combined sulfur, or it can be partially cured. By partially cured is meant elastomer containing less than 10 parts per hundred of combined sulfur. The fact that either uncured or partially cured elastomers can be employed in our novel process makes possible the use as a potential source of elastomer crumb, of various by-products and scrap from the rubber industry including molded articles such as tire treads, mold flash, compounded coagulums, etc., in addition to the more common materials, such as rubber sponge, coagulated latex and the like. Completely compounded rubber stock can also be used.

It is important that a coagulated latex be used to provide elastomer crumb. A patent to Schidrowitz, U.S. Patent 1,443,149, discloses the vulcanization of uncoagulated latex in an aqueous emulsion. If sufficient sulfur were used in the Schidrowitz process to produce a hard rubber, the final product would not consist of hard rubber particles. Vulcanized latex would have to be coagulated in order to be useful and coagulation of a vulcanized latex gives a rubbery mass instead of discrete particles.

The amount of sulfur used to convert the uncured or partially cured elastomer to hard rubber is that amount necessary to react substantially completely with the ethylene unsaturations present in the elastomer. The amount of sulfur used therefore, varies with both the nature of the elastomer, the degree of cure present, and desired final properties of the hard rubber. For example, 100 parts of a standard SBR (styrene-butadiene copolymer) containing 77% butadiene and 23% styrene requires about 40 parts of sulfur to convert it to a hard rubber. The following Table indicates amounts of sulfur necessary to completely cure, i.e., convert to hard rubber, various common elastomers.

TABLE 1

| Name of elastomer: | Amount of sulfur needed to cure 100 parts of elastomer to form hard rubber |
|---|---|
| Polybutadiene | 50–55 |
| Natural rubber or polyisoprene | 45–50 |
| SBR (23% styrene) | 38–45 |
| SBR (50% styrene) | 20–23 |
| Nitrile rubber (28% acrylonitrile and 72% butadiene) | 38–45 |

In carrying out our novel process uncured or partially cured elastomer crumb and sulfur are submerged in water and the elastomer is cured to hard rubber by heating the resulting suspension. The amount of time necessary to convert the elastomer to hard rubber is first of all dependent on particle size, i.e., the smaller the particle size, the faster the cure. More important than speed of cure, however, is the effect of particle size on quality of the finally produced hard rubber. While it is an advantage of our novel process that it is not necessary, as in the process of the prior art, to blend elastomer and sulfur prior to curing, it is nevertheless necessary to be able to insure as uniform a distribution of sulfur by our process, as can be achieved by preblending. This uniform distribution of sulfur in the elastomer is achieved by limiting the particle size of the elastomer crumb so that the radius of the particle (taken as a sphere) is less than the average distance of penetration (or diffusion) of sulfur into the elastomer particle at the cure temperature. By average distance of penetration is meant the average distance a sulfur atom will penetrate an elastomer crumb particle before reaction with the ethylenic double bond. Thus, the size of the particle of elastomer crumb is critical, since if the radius of the particle is much greater than the average penetration distance for sulfur, the center of the particle will be less cured than the outside layer. Furthermore, the cure in the outer layer of the elastomer crumb changes the physical nature of the elastomer particle since the cured portion in the outer layer forms a barrier to diffusion of the sulfur atoms, thus decreasing the average penetration distance of sulfur with the result that prolonged curing of the elastomer still will not produce the desired uniformity of cure. The upper limit of particle size of the elastomer crumb used in our novel process is 3/16 inch considered either as the diameter of a sphere, the long diameter of an ellipsoid, or the long side of an oblong. Preferably, for most uniform cure, the upper limit of the diameter of the elastomer crumb particle should be 3/32 inch. The lower limit of particle size of elastomer crumb useful in our novel process is 0.003 inch. This limit is a practical one in the sense that smaller particle sizes are difficult to achieve without use of special and expensive equipment.

During the course of the reaction provided by this invention, wherein sulfur and uncured elastomer crumbs react to form hard rubber particles while both reactants are suspended in super-heated water, there is a certain amount of oxidation of the sulfur to sulfur dioxide and hence, sulfurous acid. There is also some hydrogen sulfide produced by a sulfur substitution reaction which replaces hydrogen. Hydrogen sulfide can also be oxidized to sulfurous acid by oxygen. The cure of rubber with sulfur is accelerated by alkali as well as by oils, especially unsaturated ones which aid penetration of sulfur into the elastomer crumb by their solvency for sulfur. The cure is, however, retarded by acid. In a preferred embodiment of this invention sufficient alkali is added to the mixture of uncured elastomer crumb and sulfur to more than neutralize the sulfurous or other acid produced during the cure reaction. The alkali, usually sodium hydroxide or an amine, can be added at the beginning of the reaction or can be added in increments as the reaction preceeds.

This invention is further illustrated by the following specific examples:

Example 1

A cured natural rubber foam containing 95% rubber hydrocarbon, 2% sulfur, and 3% rubber processing aids is ground into particles capable of passing a one-eighth inch screen. 100 parts of natural rubber foam particles, 40 parts of sulfur, 8 parts of naphthenic oil, and 0.3 part of sodium hydroxide are added to 300 parts of water in a pressure vessel equipped with agitation means. The vessel is sealed and heated by steam applied to the jacket at about 287° F. for about 9.5 hours while the dispersion is being agitated. Excess water is removed by decantation from the hard hubber crumb thus formed. The hard rubber crumb is dried at about 180° F. and is then ground in a differential roller mill until all of the material passes an 80 mesh U.S. standard screen.

Example 2

The procedure of Example 1 is repeated except that no caustic is added.

Hard rubber dust formed according to the procedure of both Examples 1 and 2 are evaluated as follows: 100 parts of the hard rubber dust are mixed on a laboratory differential rubber mill with 100 parts of uncured styrene-butadiene copolymer (23% styrene), 40 parts of sulfur, 4 parts of mercapto-benzthiazole, 4 parts of mercapto-benzthiazole disulfide, and 2 parts of zinc oxide. The resulting slab stock is aged for 24 hours, and is then molded into ASTM tensile bars which are cured in a mold under pressure for either 40 to 60 minutes at 305° F. The hard rubber bars thus provided are tested for tensile strength and for elongation. The table which follows gives the results of these tests.

TABLE 2

PROPERTIES OF HARD RUBBER DUST

| Time of Cure | From Example 1 | | From Example 2 | |
| --- | --- | --- | --- | --- |
| | Tensile Strength | Elongation | Tensile Strength | Elongation |
| 40 min | 8,680 | 6.2 | 6,312 | 13.8 |
| 60 min | 9,160 | 5.7 | 7,300 | 7.4 |

The equipment employed for forming hard rubber by the process of this invention can be any type of corrosion resistant pressure vessel having either a horizontal or a vertical axis and equipped with agitation means. It is necessary to stir the cure mixture since elastomer crumb is lighter than water and sulfur is heavier than water and the two will separate if not constantly agitated. The agitation means can be either a paddle type stirrer or a circulating pump with a jet return at the bottom of the reactor. The process can also be made continuous by adapting prior art techniques to the batch process illustrated above.

We claim:
1. The method of making hard rubber particles which comprises suspending in water sulfur-vulcanizable elastomer crumb particles having a diameter greater than 0.003 inch, but less than 3/16 inch, and having from 0–10 parts of combined sulfur per 100 parts of elastomer crumb, with sufficient sulfur to cure completely the said elastomer crumb, heating and agitating said aqueous suspension under super-atmospheric pressure until said elastomer crumb is substantially completely cured.
2. The method of making hard rubber particles which comprises suspending in water sulfur-vulcanizable elastomer crumb particles having a diameter greater than 0.003 inch but less than 3/16 inch, and having from 0–10 parts of combined sulfur per 100 parts of elastomer crumb, with sufficient sulfur to cure completely the said elastomer crumb, heating and agitating said aqueous suspension in the presence of alkali under super-atmospheric pressure until said elastomer crumb is substantially completely converted to hard rubber.

References Cited by the Examiner

UNITED STATES PATENTS 1,443,149   1/1923   Schidrowitz _____ 260—776

JOSEPH L. SCHOFER, *Primary Examiner.*

D. K. DENENBERG, *Assistant Examiner.*